Jan. 18, 1949.   E. A. ROCKWELL   2,459,456
FLUID PRESSURE VALVE
Original Filed June 4, 1943
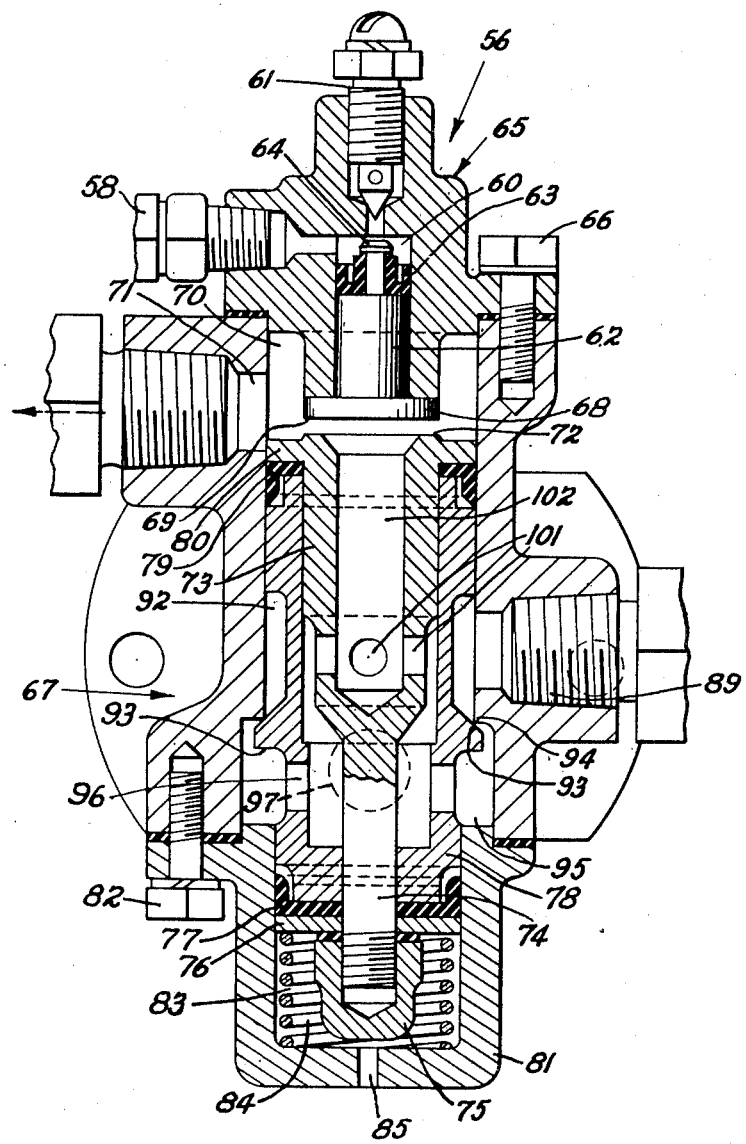
INVENTOR
EDWARD A. ROCKWELL
BY Arthur Wright
ATTORNEY Patented Jan. 18, 1949

2,459,456

UNITED STATES PATENT OFFICE 2,459,456

FLUID PRESSURE VALVE

Edward A. Rockwell, Cleveland, Ohio

Original application June 4, 1943, Serial No. 489,713. Divided and this application April 6, 1944, Serial No. 529,866

10 Claims. (Cl. 121—46.5)

My invention relates particularly to valves designed to control the delivery of fluids under pressure and which are controlled by the application of another pressure.

This application is a divisional of my copending application Ser. No. 489,713, filed June 4, 1943, upon Locomotive reverse gear mechanism.

The object of my invention is to provide a fluid pressure valve of an advantageous character, and which may control the delivery of fluids under pressure by the application of another fluid pressure thereto. Another object is to provide a valve of this character which has an inlet valve for the pressure fluid located on a movable means which is balanced both as to the inlet of the pressure fluid as well as the effects of pressure fluid delivered by the valve. A further object is to provide a valve of this character in which the inlet valve is carried on a sleeve located around a plunger provided with an exhaust valve so that one or more seals may be placed under compression between the sleeve and plunger. Another object is to provide a new type of quick-acting modulator valve in connection with locomotive reverse gears, etc. Again, another object is to provide a valve mechanism for this purpose which saves compressed air or steam. Further objects of my invention will appear from the detailed description of the same hereinafter.

As to the valve structure, this is a continuation in part of my copending application Ser. No. 397,896, filed June 13, 1941, upon Travel control actuating apparatus, Patent No. 2,372,014, granted March 30, 1945.

While my invention is capable of embodiment in many different forms, for the purpose of illustration I have shown only one form thereof in the accompanying drawings in which the figure is a horizontal section showing the details of the modulator valve therein.

In the drawing, I have shown a pipe 58 which communicates with a plunger chamber 60, having an air bleeder screw 61, upon the removal of which the accumulated air can be allowed to escape. The chamber 60 is provided with a valve plunger 62 operating in the chamber 60 having a rubber seal 63 supported on a headed screw 64 attached to the plunger 62. Said plunger 62 is carried by a cap 65 attached by screws 66 to a valve casing 67. The plunger 62, furthermore, has a head 68 provided with a flat valve seat 69 located in an annular chamber 70 communicating with an air exhaust port 71. The said head 68, furthermore, cooperates with a valve element 72 on a valve member 73 having on its end a stem 74 provided with an adjusting nut 75 which is adjacent to a washer 76 and a seal 77 seating on a plunger sleeve 78, which slides in the casing 67, having a seal 79 on the valve member 73 adjacent to a flange 80 on the end of said valve member 73. The seal 77 seals the plunger sleeve 78 within a cap 81 connected by screws 82 to the valve casing 67. Within the said cap 81 there is a chamber 83 carrying a coil spring 84 for normally forcing the valve member 73 towards the left, and a vent 85 is located in the cap 81 communicating with the outer air.

Compressed air or steam is admitted from any suitable supply pipe 88 to an inlet port 89 in the valve casing 67. The compressed air entering the port 89 is received in an annular chamber 92 in the periphery of the plunger sleeve 78 and adjacent to this chamber 92 the plunger sleeve 78 has a conical valve 93 adapted to seat on a valve 94 on the interior of the valve casing 67. When the valve 93, 94 is unseated by pressure from the plunger 62 the compressed air enters the annular chamber 92 and passes through ports 96 in the plunger sleeve 78 whence it is delivered by an outlet port 97 to an air cylinder (not shown). The exhaust air is released by passing through ports 101 into a central chamber 102, thence to the chamber 70 and finally to the exhaust port 71.

In the operation of the valve made in accordance with my invention, the master cylinder (not shown) will be operated, forcing the liquid through the pipe 49 into the passageway 57 and pipe 58 to the plunger chamber 60. The first action of the liquid received from the pipe 58 will be to move the plunger 62 downwardly so as to close the valve head 68 against the plunger valve 72 so as to close the exhaust valve and prevent the exit of exhaust air through the port 71. Continued downward movement of the plunger 62 will unseat the inlet valve 93, 94 as far as desired to permit the compressed air admitted by the inlet port 89 to be delivered to the chamber 95 and thence to the delivery port 97. It will be noted that, even when the valve 93, 94 is opened, because of the chamber 92 the inlet valve 93, 94 is balanced in both directions as to the inlet pressures exerted within the chamber 92 and that because of the chamber 95 the valve 93, 94 and the plunger sleeve 78 have balancing areas tending to exert opposing pressures thereon in both directions as to the fluid pressure delivered through the delivery passageway 97. Also, when the valve 93, 94 is opened the internal upwardly pressed area acting on the unit 73, 78 has approximately the same diameter as the internal downwardly pressed area acting on the unit 73, 78. There is, of course, when the valve 93, 94 is open, a downwardly directed manual force exerted on the plunger 68 but the hydraulic pressure forces acting on the unit 73, 78 balance each other substantially as above pointed out, although the internal upwardly pressed area on the upper part of the sleeve 78 may be slightly larger than the internal downwardly pressed area on said sleeve 78. The exhaust of the delivered pressures can take place through the openings 96 and 101 by means of the passageway 102 through the valve 69, 72 and thence to the discharge port 71. Furthermore, it will be noted that the seals 77 and 79 can be placed under compression by the nut 75 being turned adjustably on the end of the screw-threaded stem 74 to tighten the seals within the cylinders in which they are carried. The plunger valve 69, 72 will thus be closed, after which the valve member 73 unseats the valve 93, 94, thus admitting compressed air from the port 89 into the chamber 95 and thence through the port 97. It will be noted, furthermore, that whenever the valve 93, 94 is being operated there is a slight "feel" exerted on the manual operating means through the plunger 62. This is owing to the fact that due to the plunger areas there is a slightly greater force exerted upwardly on the plunger in the valve casing 67 than downwardly on the plunger in the cap 81. This arrangement also has the advantage of permitting the large valve at 94 to give a wide valve opening.

While I have described my invention above in detail I wish it to be understood that many changes may be made therein without departing from the spirit of the same.

I claim:

1. A modulator valve, provided with a casing, having a connection to a supply of compressed air, a hydraulically operated connection for operating the valve, a plunger, having a cylinder, operated from the hydraulic connection, an outlet valve member connected to said plunger, a plunger valve having an element, provided with a discharge chamber, cooperating with the outlet valve member to control the exhaust, and a plunger sleeve fixedly connected to the plunger valve element having an inlet valve thereon, said plunger sleeve having a chamber around the same for receiving the compressed air which balances the plunger sleeve in both directions from the casing and being provided with a chamber within the same communicating with the discharge chamber within the plunger valve element.

2. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element, provided with a discharge chamber, cooperating with the outlet valve member to control the exhaust, and a conical inlet valve connected to the plunger valve, said inlet valve having balancing areas both as to the said supply and said delivery of pressure fluid.

3. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element, provided with a discharge chamber, cooperating with the outlet valve member to control the exhaust, and a conical inlet valve, located on a sleeve connected to the plunger valve, said sleeve having balancing areas both as to the said supply and said delivery of pressure fluid.

4. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element cooperating with the outlet valve member to control the exhaust, and a conical inlet valve, located on a sleeve connected to the plunger valve, said sleeve having balancing areas both as to the said supply and said delivery of pressure fluid, said plunger valve having an adjusting nut on a screw-threaded stem carried by the plunger valve and passing through the sleeve to adjust the relative positions of the plunger valve and the sleeve.

5. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element cooperating with the outlet valve member to control the exhaust, and a conical inlet valve, located on a sleeve connected to the plunger valve by an adjustably compressible seal, said sleeve having balancing areas both as to the said supply and said delivery of pressure fluid.

6. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element cooperating with the outlet valve member to control the exhaust, and a conical inlet valve, located on a sleeve connected to the plunger valve by an adjustably compressible seal, said sleeve having balancing areas both as to the said supply and said delivery of pressure fluid, said plunger valve having an adjusting nut on a screw-threaded stem carried by the plunger valve and passing through the sleeve to adjust the relative positions of the plunger valve and the sleeve.

7. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element, provided with a discharge chamber, cooperating with the outlet valve member to control the exhaust, and a conical inlet valve, located on a sleeve connected to the plunger valve, said sleeve having balancing areas both as to the said supply and said delivery of pressure fluid, said sleeve having an inlet chamber connected to said first mentioned connection.

8. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element, provided with a discharge chamber, cooperating with the outlet valve member to control the exhaust, and a conical inlet valve, located on a sleeve connected to the plunger valve, said sleeve having balancing areas both as to the said supply and said delivery of pressure fluid, said sleeve having an inlet chamber connected to said first mentioned connection on one side of the inlet valve and a delivery chamber on the other side of said inlet valve.

9. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element cooperating with the outlet valve member to control the exhaust, and a conical inlet valve, located on a sleeve connected to the plunger valve, said sleeve having balancing areas both as to the said supply and said delivery of pressure fluid, said sleeve having a piston head connected internally to the delivery connection.

10. A modulator valve having a connection to a supply of pressure fluid, a fluid operated connection for operating the valve, a plunger, having a cylinder, operated from the fluid connection, a delivery connection for supplying pressure fluid to perform work, an outlet valve member connected to said plunger, a plunger valve having an element cooperating with the outlet valve member to control the exhaust, and a conical inlet valve, located on a sleeve connected to the plunger valve, said sleeve having balancing areas both as to the said supply and said delivery of pressure fluid, said plunger valve having an adjusting nut on a screw-threaded stem carried by the plunger valve and passing through the sleeve to adjust the relative positions of the plunger valve and the sleeve, said sleeve having a piston head connected internally to the delivery connection.

EDWARD A. ROCKWELL.

REFERENCES CITED

The following references are of record in the file of this patent:

UNITED STATES PATENTS

| Number | Name | Date |
| --- | --- | --- |
| 721,499 | Brennan | Feb. 24, 1903 |
| 948,649 | Koelkebeck | Feb. 8, 1910 |
| 1,566,111 | Miller | Dec. 15, 1925 |
| 1,962,857 | Cash | June 12, 1934 |
| 1,991,902 | Lloyd | Feb. 19, 1935 |
| 2,165,001 | Meyer | July 4, 1939 |
| 2,276,418 | Rockwell | Mar. 17, 1942 |
| 2,352,357 | Almond | June 27, 1944 |

FOREIGN PATENTS

| Number | Country | Date |
| --- | --- | --- |
| 443,165 | Great Britain | Feb. 24, 1936 |